L. H. SCOTT.
POST MOLD.
APPLICATION FILED MAY 13, 1910.
977,136.
Patented Nov. 29, 1910.
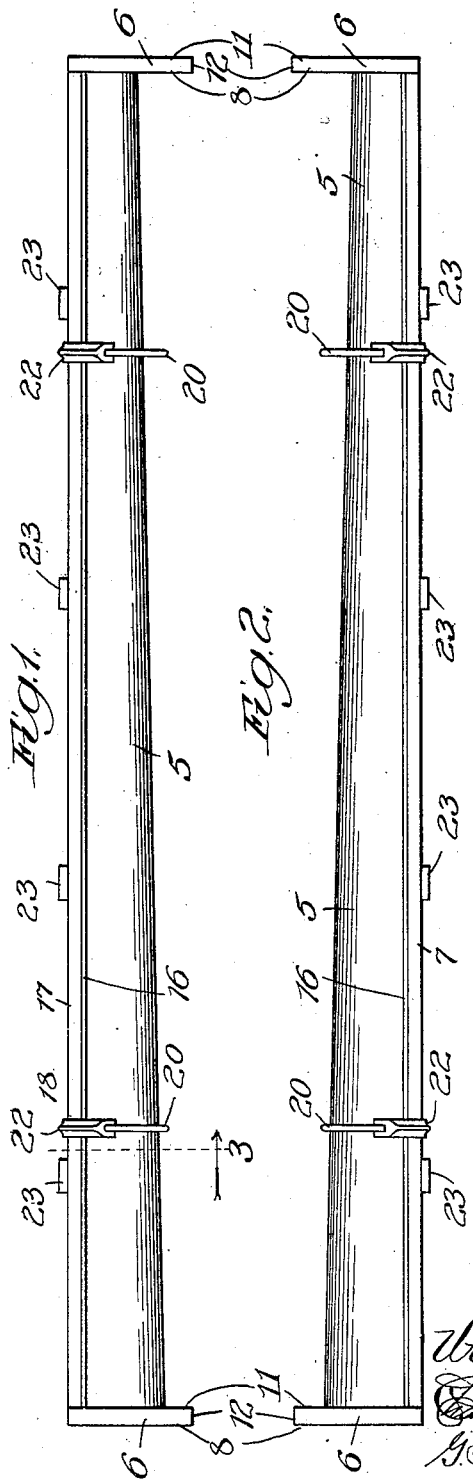
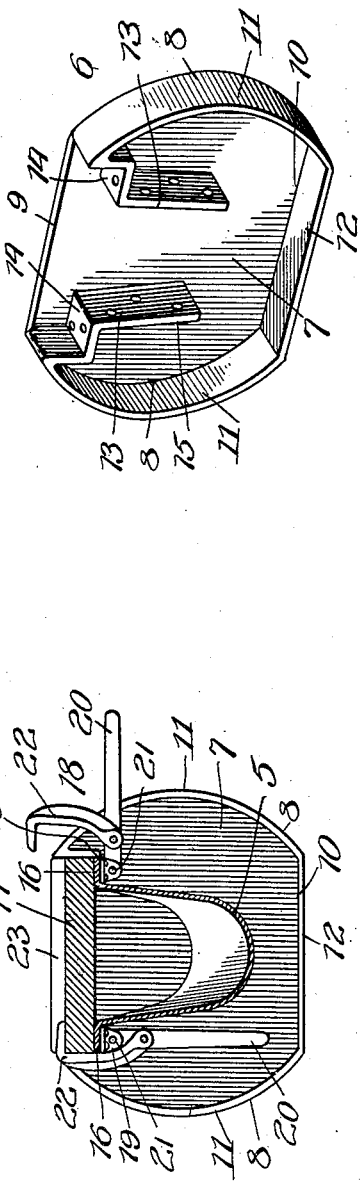
Witnesses:
Inventor:
Louis H. Scott,

UNITED STATES PATENT OFFICE.

LOUIS H. SCOTT, OF BUDA, ILLINOIS, ASSIGNOR TO ILLINOIS CONCRETE MACHINERY COMPANY, OF BUDA, ILLINOIS, A CORPORATION OF ILLINOIS.

POST-MOLD.

977,136.  Specification of Letters Patent.   Patented Nov. 29, 1910.

Application filed May 13, 1910. Serial No. 561,249.

*To all whom it may concern:*

Be it known that I, LOUIS H. SCOTT, a citizen of the United States, residing at Buda, in the county of Bureau and State of Illinois, have invented a new and useful Improvement in Post-Molds, of which the following is a specification.

My object is to provide a simple construction of mold of the character stated which may be manufactured at relatively low cost, and be easily and quickly operated to mold posts without subjecting the molded material to jarring actions tending to impair the integrity of the molded post.

My invention is illustrated in the accompanying drawing, in which—

Figure 1 is a view in side elevation of a mold constructed in accordance with my invention, the mold in this view being shown in upright position, viz., the position it occupies while being filled with concrete. Fig. 2 is a view like Fig. 1 showing the mold inverted, in which position the molded post is freed from the mold. Fig. 3 is an enlarged section taken at the line 3 on Fig. 1 and viewed in the direction of the arrow; and Fig. 4, a perspective view of one of the two similar end bearing-heads with which the mold is equipped and on which it is adapted to be turned for inverting it.

The mold, generally stated, comprises a trough 5 equipped at its opposite ends with bearing-heads 6 at which the mold rests on the ground, or floor, as the case may be, and at which it is moved from upright to inverted position, as hereinafter explained. The heads 6 are formed of plates 7 of general circular-shape in contour affording opposed arc-shaped edges 8, with straight-edged portions 9 and 10 at opposite edges of the heads, as illustrated in Fig. 4. The heads 6 at their curved edges 8 and lower straight edges 10 are preferably provided with inwardly-extending flanges 11 and 12 of a shape corresponding with the edges of the heads from which they extend, as illustrated in Fig. 4, whereby relatively broad bearing-surfaces for the heads to rest on the ground, or floor, are provided. The upper portions of the heads on their inner faces are provided with brackets 13 spaced apart horizontally and formed with shoulders 14 affording seats for the trough 5 as hereinafter described, and with depending portions 15, the brackets in the constructions shown being integrally connected with the flanges 11 at their upper ends. The trough 5 is formed of sheet-metal bent transversely into the cross-sectional shape necessary for forming a post of the desired contour, the trough in the construction shown being rounded at its lower end to form a post curved on one side. The upper edges of the trough are deflected outwardly to form horizontally-extending flanges 16 which seat at their extremities upon the shoulders 14 of the brackets 13 and to which they are riveted, the trough at its ends extending into the space between the depending portions 15 of the brackets to which it is rigidly secured.

The filling position of the mold is that illustrated in Fig. 1, in which the heads 6 rest on the ground, or floor, at their flanges 12, and the trough 5 is in upright position. To make a post, the concrete is filled into the trough and tamped by any suitable tool (not shown) to the desired density, then leveled off and corrugations formed in its upper face if desired, whereupon a pallet 17, which may be a board, is seated on the top of the molded material and the upper surfaces of the trough-flanges 16. The pallet should then be clamped in place, by any suitable means, such for instance as those illustrated, which comprise a plurality of clamps 18 secured at intervals to the flanges 16 at the opposite sides of the trough, and each preferably formed of a head 19 secured to the underside of the flange 16, a lever 20 pivoted at one end to the head 19, as indicated at 21, and a jaw 22 pivoted at its lower end to the lever 20 between the ends of the latter and adapted to engage with the upper surface of the pallet 17 at its adjacent marginal edge-portion and be held thereto against accidental displacement when the lever 20 connected therewith is swung to the position illustrated of the one on the left-hand side of Fig. 3. After the pallet has been clamped in position as described, the molded post is ready to be freed from the mold and this is effected by turning the mold over to the position illustrated in Fig. 2, the mold in this operation turning on the curved flanges 11 to a position in which it is inverted and rests on the ground, or floor, at cleats 23 secured to the upper surface of the pallet 17, these cleats being of a greater thickness than that of the jaws 22, whereby when the mold is inverted its weight does not rest upon the jaws. After inverting the mold as described, the clamps 18 are disengaged from the pallet 17 by swinging the levers 20 outwardly and downwardly, whereupon the mold thus disconnected from the pallet may be lifted from the pallet 17 by the levers 20 to free the molded post, which latter is allowed to rest on the pallet 17 until it has become set sufficiently to permit it to be handled.

It will be noted from the foregoing that the removal of the molded post from the mold is effected without requiring the post to be lifted, the mold simply turning over on the curved flanges 11 of the heads, to inverted position and freeing itself of its contents, without subjecting them to jarring action, which would tend to impair the molded post.

What I claim as new, and desire to secure by Letters Patent, is—

A mold formed of bearing-heads provided with flat bottom portions and curved sides, brackets secured on the inner faces of the heads to extend transversely of such faces and provided with shouldered portions forming seats, and a trough connecting the heads together and provided with outwardly-extending flanges seating at their ends upon and secured to said shouldered portions of the brackets.

LOUIS H. SCOTT.

In presence of—
R. A. SCHAEFER,
JOHN WILSON.